E. H. SCHOFIELD.
TRANSMISSION GEARING.
APPLICATION FILED FEB. 23, 1911.

1,071,804.

Patented Sept. 2, 1913.

2 SHEETS—SHEET 1.

Witnesses:

Inventor:
Eugene H. Schofield
By Brown & Hopkins
Attys.

E. H. SCHOFIELD.
TRANSMISSION GEARING.
APPLICATION FILED FEB. 23, 1911.
1,071,804.
Patented Sept. 2, 1913.
2 SHEETS—SHEET 2.
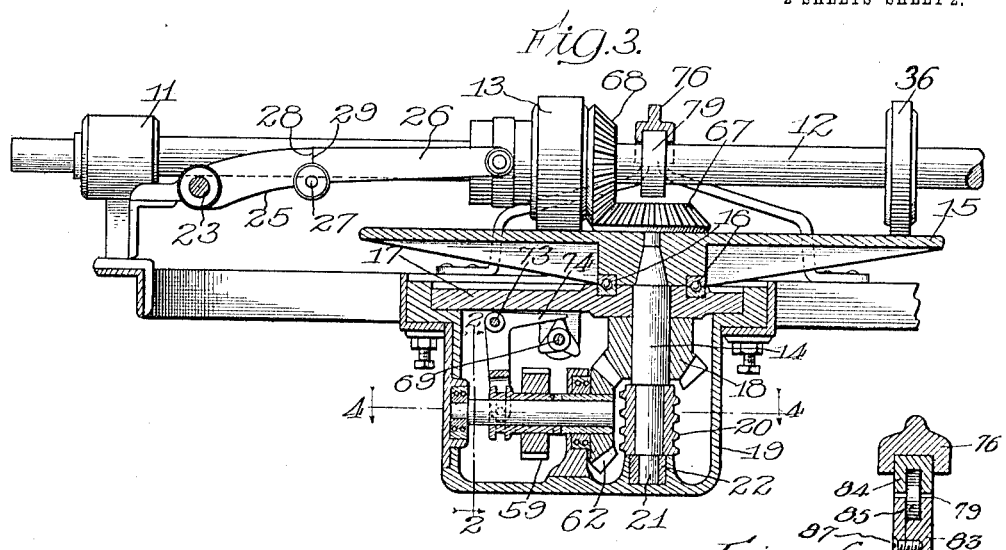
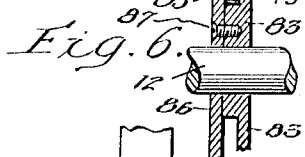
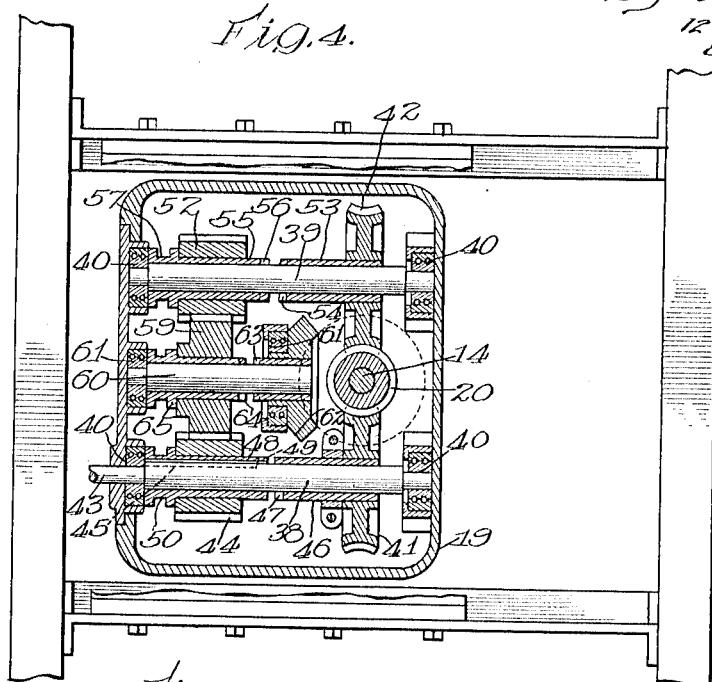
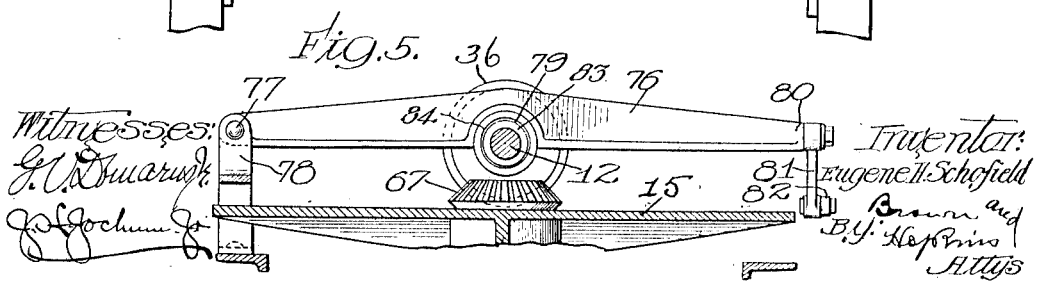

UNITED STATES PATENT OFFICE.

EUGENE H. SCHOFIELD, OF ATLANTA, GEORGIA; RAY H. SCHOFIELD, OF COOK COUNTY, ILLINOIS, ADMINISTRATOR OF SAID EUGENE H. SCHOFIELD, DECEASED.

TRANSMISSION-GEARING.

1,071,804.  Specification of Letters Patent.  Patented Sept. 2, 1913.

Application filed February 23, 1911. Serial No. 610,126.

*To all whom it may concern:*

Be it known that I, EUGENE H. SCHOFIELD, a citizen of the United States, residing at Atlanta, in the county of Fulton and State of Georgia, have invented certain new and useful Improvements in Transmission-Gearing, of which the following is a specification.

This invention relates to improvements in transmission gearing, particularly adapted though not necessarily limited in its use to motor vehicles and one of the objects of the invention is to provide an improved mechanism of this character having frictional gearing for use in starting and for obtaining a slow and steady speed, and also positive gearing for propelling the vehicle, a further object being the provision of improved gearing of this character having means whereby a change may be readily made from either of the gearings to the other and at will.

A further object is the provision of an improved gearing of this character having emergency mechanism adapted to be rendered active at will.

A still further object is to provide an improved gearing of this character which will be simple, durable and cheap in construction, and effective and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawings exemplifying the invention, and in which—

Figure 1:
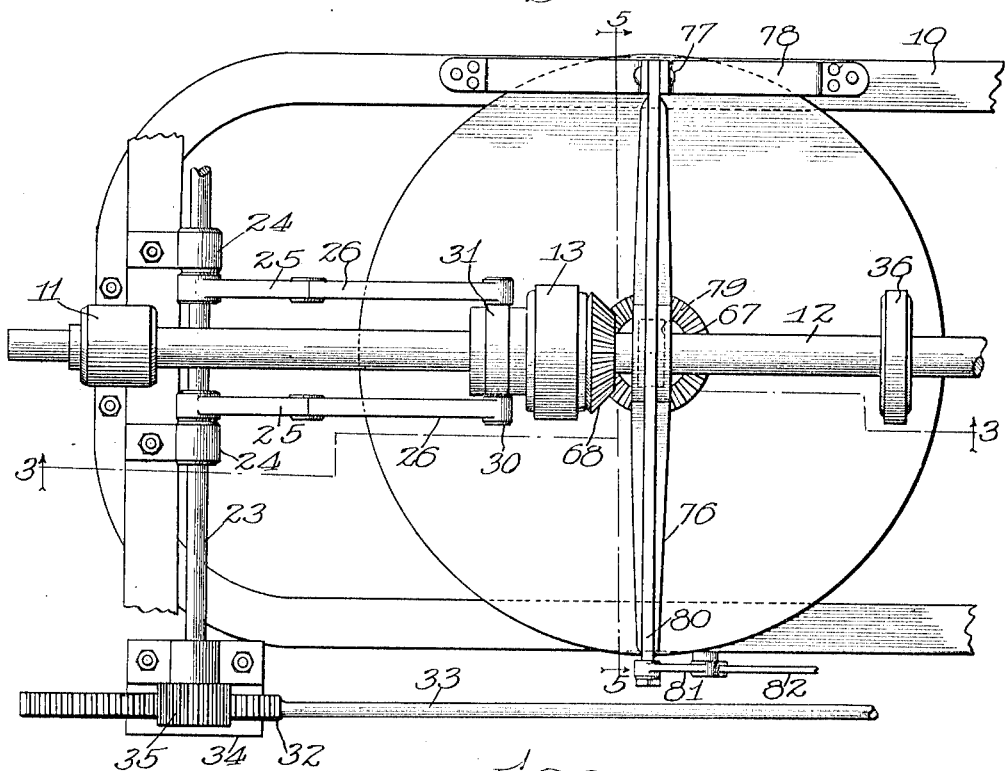
Figure 2:
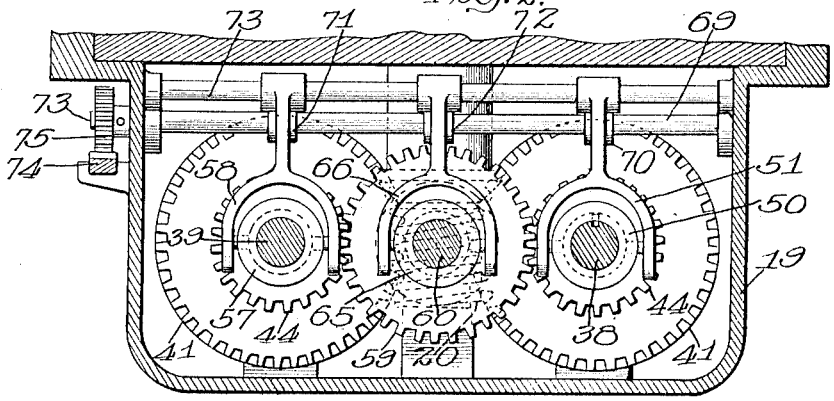

Figure 1 is a top plan view of an improved gearing of this character constructed in accordance with the principles of this invention. Fig. 2 is a detail sectional view taken on line 2—2, Fig. 3. Fig. 3 is a sectional view on line 3—3, Fig. 1. Fig. 4 is a sectional view on line 4—4, Fig. 3. Fig. 5 is a sectional view on line 5—5, Fig. 1. Fig. 6 is a detail sectional view of the roller bearing.

Referring more particularly to the drawings and in the present exemplification of the invention, the numeral 10 designates a portion of the frame work upon which are mounted suitable bearings 11 (one only of which is shown) in which is journaled the driving shaft 12, which receives its motion from any suitable source of power. This shaft preferably is arranged to extend longitudinally of the frame, and mounted thereon so as to rotate therewith, but which is also capable of longitudinal adjustment on the shaft 12 is a frictional gear 13. Arranged below the shaft 13 and mounted so as to rotate with an upright shaft 14 and also to rotate in a substantially horizontal plane is a friction disk 15 with which the friction gear 13 coöperates. This disk 15 may be of any desired size and is supported by means of a ball bearing 16 so as to reduce friction. The shaft 14 is mounted in any suitable bearing and extends preferably for some distance below the main frame 10.

The bearing for the shaft 14 is provided in a support 17 beneath which is arranged a gear 18 which latter is secured to the shaft 14 for rotation therewith. A housing 19 is provided for the lower extremity of the shaft 14 and also the gear 18. This housing is preferably of a size to house the various gears and clutches which will be hereinafter described. Secured also to the shaft 14 for rotation therewith and preferably below the gear 18 is an upright worm 20 and the lower extremity 21 of the shaft 14 is preferably stepped in a bearing 22 of the housing 19.

The gear 13 is adapted to be shifted longitudinally on the shaft 12 so as to be moved toward or away from the periphery of the disk 15 in any desired or suitable manner, preferably by means of a rock shaft 23 which is arranged transversely with respect to the shaft 12 and preferably beneath the shaft and is mounted in suitable bearings 24. Connected with the shaft 23 are jointed levers comprising the sections 25, 26, pivotally connected as at 27 so that the adjacent extremities 28, 29, of the respective sections 25, 26, when the gear 13 is in close proximity to the center of the disk 15, will abut and hold the gear 13 against longitudinal movement on the shaft 12. The free extremities of the sections 26 of the levers are connected to a collar 31, which latter has loose connection with the hub of the friction gear 13. The shaft 23 may be rocked in any desired or suitable manner, preferably by means of a rack 32 at the end of a bar or rod 33 which latter is controlled and adapted to be adjusted by any suitable mechanism arranged in a convenient position for the operator on the vehicle. This rack 32 slides in a suitable guide 34 and engages a pinion 35 carried by the shaft 23. Thus it will be manifest that when the bar or rod 33 is shifted in one direction or the other the rack 32 will impart rotation to the pinion 35 and this will in turn rock the shaft 23 to break the joint between the ends of the sections 25, 26, of the lever, (assuming the parts to be in the position shown in Figs. 1 and 3), to shift the gear 13 toward the periphery of the disk 15 so that a slow speed will be imparted to the disk. When the rack 32 is moved in the opposite direction the gear 13 will also be shifted in the opposite direction and away from the periphery of the disk 15.

The shaft 12 is arranged in such a position with respect to the upper surface of the disk 15 that it will normally hold the periphery of the gear 13 so that it will bear lightly on the disk without pressure, thereby permitting the friction gear 13 to slide freely over the face of the disk without transmitting power thereto.

Mounted upon the shaft 12 and in any convenient position with respect to the disk 15 is an idler 36 which is adapted to engage the face of the disk and is provided for the purpose of equalizing the pressure on the face of the disk 15.

Arranged within the housing 19 are a pair of shafts 38, 39, which are journaled in suitable bearings 40 and one of these shafts is arranged on each side of the upright shaft 14. Mounted loosely upon the shaft 38 is a worm gear 41 which is so arranged with respect to the upright worm 20 as to mesh therewith and mounted upon the shaft 39 is a similar worm 42 which also meshes with the upright worm 20. The shaft 38 projects beyond the housing as at 43 (see Fig. 4) and is connected in any desired or suitable manner so as to impart motion to the wheels of the vehicle through the usual differential gears, etc., if the latter are employed. A gear 44 is mounted upon the shaft 38 within the housing 19 so as to rotate therewith and for this purpose there is provided the usual key or spline connection 45, which latter also permits the gear 44 to be adjusted longitudinally on the shaft 38 so as to lock the gear 41 to the shaft for rotation therewith or to unlock the gear so as to permit the shaft to rotate independently with respect to the gear. Any suitable means may be provided for thus locking the gear 41 to the shaft and for this purpose the gear 41 is provided with a hub or sleeve 46 which has a clutch face 47 and the gear 44 is also provided with a hub or sleeve 48 which in turn has a clutch face 49. The gear 44 is also provided with a collar 50 to which is connected the usual yoke 51 and by means of which yoke the gear 44 may be shifted longitudinally on the shaft 38 so as to move the clutch faces 49, 47, into or out of engagement as desired.

A gear 52 similar to the gear 44 is provided and mounted loosely on the shaft 39 and this gear 52 is adapted to be thrown into operating position to lock the gears 42 and 52 for rotation together when it is desired to reverse the operation of the shaft 38. For this purpose the gear 42 is provided with a hub or sleeve 53 having a clutch face 54 and the gear 52 is provided with a hub or sleeve 55 having a clutch face 56. A collar 57 is also provided on the gear 52 with which a yoke 58 (see Fig. 2) coöperates in the ordinary and usual manner and is adapted to shift the gear 52 on the shaft 39 and longitudinally with respect thereto. This gear 52 is preferably mounted loosely upon the shaft 39 and the gear is adapted to be locked for operation only when the clutch faces 54, 56, are in engagement.

With this mechanism thus far described, it will be apparent that motion is imparted to the shaft 14 through the medium of the friction gears 13, 15, and the rotary motion of the shaft may be imparted to the shaft 38 to drive the vehicle forward when the gear 44 locks the gear 41 to the shaft 38. When it is desired to reverse the direction of motion of the shaft 38 the gear 41 is unlocked from the shaft and the gear 52 is locked with the gears 42 for rotation thereby in the manner already described. When thus locked it will be apparent that motion will be imparted to the gear 42 through the medium of the worm 20 and the gear 52 will be rotated, which in turn will rotate the gear 59 and the rotary motion of the gear 59 will be imparted to the gear 44 which is splined or keyed to the shaft 38, to rotate the latter in the opposite direction or in a reverse direction, (see particularly Fig. 4) and which operation is performed through the gear 59 which latter is mounted loosely upon an intermediate shaft 60 journaled in suitable bearings 61.

The friction gearing comprising essentially the gear 13 and disk 15 is provided for starting the vehicle at a slow speed and for maintaining the speed steady. The slowest speed will be obtained when the friction gear 13 is near the periphery of the disk 15. The speed of the vehicle may be increased by adjusting the friction gear 13 toward the diametric center of the disk 15 or toward the shaft 14 and when the gear 13 has reached this position (as shown in Fig. 3), the highest speed will be imparted to the disk and the shaft 14. The worm gears are thus provided for the purpose of acting as a reducer of the speed, as will be understood.

In order to impart a reasonable speed to the vehicle there are provided mechanisms by means of which the worm gear structure may be eliminated and in order to accomplish this the gear 18 is provided on the shaft 14 and a gear 62 is provided on the shaft 60 and is loosely mounted on the shaft so that it may be rotated independently with respect to the shaft. This gear 62 meshes with the gear 18 and it will be apparent that although this gear 62 always remains in mesh with the gear 18, its rotation while the frictional driving mechanism is being employed, will not interfere with the operation of the frictional driving mechanism. In order to render the gear 62 active for the purpose of imparting motion to the shaft 38 when the frictional gearing above described has reached its highest rate of speed, mechanism must be provided for locking the gear 62 for rotation with the gear 59. In order to accomplish this result, a clutch face or element 63 is provided and connected with the gear 62 and a coöperating clutch face 64 is provided and connected with the gear 59. When the gear 59 is shifted to the position shown in Fig. 4 so that the clutch faces 63, 64, are out of engagement, the frictional driving mechanism will operate in the manner already described but when the gear 59 is shifted so as to lock the gear 62 for operation, and the gears 44, 52, shifted so as to unlock the gears 41, 42, the driving will be effected from the shaft 14 through the gears 18, 62, gear 59 and gear 44 to the shaft 38. The gear 59 is adapted to be shifted in a manner similar to the gears 44, 52, that is, by means of a collar 65 connected with the gear 59 coöperating with which collar is a yoke 66. When this gear 62 is rendered active for driving the vehicle it is advisable that the shaft 14 be positively driven and in order to accomplish this result a gear 67 is connected to the shaft 14 for rotation therewith and this gear is preferably located to project above the face of the disk 15. A gear 68 is connected with the friction gear 13 so that when the gear 13 reaches the point with respect to the gear 15 at which it will impart the highest rate of speed to the disk 15, the gear 68 will move into mesh with a gear 67 and the motion will be imparted directly from the shaft 12 to the shaft 14 through the medium of the intermeshing gears 67, 68.

The gears 44, 52, 59 are adapted to be shifted into and out of operating positions at will in any desired or suitable manner. A simple and efficient means for accomplishing this result comprises a rock shaft 69 provided with cams 70, 71, 72, and the yokes 51, 58, 66, are constructed in the form of bell crank levers pivotally supported as at 73 and one arm 74 of the respective bell cranks is so disposed with relation to the respective cams 70, 71, 72, that when the shaft 69 is rocked, one of the cams will engage the respective arm 74 to shift the respective gears 44, 52, 59 as will be understood. The shaft 73 may be rocked in any desired or suitable manner from the vehicle. A simple and efficient means which is here shown for rocking this shaft comprises a rack 74 which is adapted to be controlled by the operator and this rack 74 meshes with a gear 75 on the shaft 73.

As has already been set forth, the shaft 12 is so arranged with respect to the surface of the disk 15 and the diameter of the gear 13 is such that normally the periphery of the gear 13 will bear lightly upon the face of the disk 15 so as to permit the ready shifting of the gear 13. In order therefore to control the degree of pressure of this gear 13 on the face of the disk 15 so that the desired motion will be imparted to the disk 15, any suitable mechanism may be provided. A simple and efficient means for accomplishing this result will now be described.

A pressure bar or rod 76 is provided which extends over the shaft 12, transversely with respect thereto, and is pivotally supported as at 77 to any fixed support 78. Arranged beneath the pressure bar 76 and having a bearing upon the shaft 12 is a roller bearing member 79, comprising inner and outer rings 83 and 84, the former of which is secured to the shaft 12 and comprises a removable plate 86 secured to the ring by means of screws 87 and rotatable within the outer ring 84. The rings are provided with channels in their abutting faces adapted for the reception of bearing rollers 85. The ring 84 is arranged for engagement with the bar or rod 76 and downward pressure on the ring forces the bearing rollers 85 against the inner ring 83, thereby serving to regulate the speed of the shaft 12. The free extremity 80 of the pressure bar or rod is adapted to be lowered or moved in a direction to force the shaft 12 downwardly to move the gear 13 into engagement with the face of the disk in any suitable manner, preferably by means of a link 81 which is pivotally connected to the free extremity of the pressure bar and connected to the other extremity thereof is a member 82 which is connected with suitable mechanism on the vehicle arranged in convenient position for the operator, so that when the operator actuates this member 82 the pressure bar 76 will be drawn downwardly to effect the desired degree of friction between the gear 13 and disk 15. The pressure bar 76 also serves the function of resisting any tendency of the shaft 12 to spring upwardly which would tend to move the gear 68 out of mesh with the gear 67.

With this improved construction and arrangement of parts it will be manifest that the various clutches and gears may be controlled at the will of the operator and the clutches so positioned that motion may be imparted to the gear 62 in any desired manner, either through the medium of the friction drive or by the positive drive through the medium of the gears 68, 67. Furthermore any one or more of the various gears may be thrown into or out of action to meet the existing conditions or the desire of the operator.

What is claimed as new is—

1. The combination of driving and driven shafts, positive forward driving and reversing mechanism, operatively connected with one of the shafts, a friction disk disposed to rotate in a substantially horizontal plane and operatively connected with said forward driving and reversing mechanism, a friction gear operatively connected with the other of said shafts and coöperating with the said disk, and means individual to said positive and friction mechanisms for rendering either of them active or inactive at will.

2. The combination of driving and driven shafts, an intermediate shaft operatively connected with one of the first two recited shafts, friction gearing operatively connecting the other of the first two recited shafts and the intermediate shaft, positive gearing for also operatively connecting the last two recited shafts, and means whereby the said intermediate shaft may be driven through either the said friction gearing or the positive gearing.

3. The combination of driving and driven shafts, an intermediate shaft operatively connected with one of the first two recited shafts, friction gearing operatively connecting the other of the first two recited shafts and the intermediate shaft, positive gearing for also operatively connecting the last two recited shafts, and means whereby the intermediate shaft may be driven through either the said friction gearing or the positive gearing, and at will.

4. The combination of driving and driven shafts, an intermediate shaft operatively connected with one of the first two recited shafts, friction gearing operatively connecting the other of the first two recited shafts and the intermediate shaft, positive gearing for also operatively connecting the last two recited shafts, and means common to both of the said friction and the positive gearings for rendering one inactive while the other remains active.

5. The combination of driving and driven shafts, an intermediate shaft, means operatively connecting said intermediate shaft with one of the first recited shafts and embodying forwardly and rearwardly driving mechanism, friction gearing operatively connecting said intermediate shaft with the other of the first two recited shafts, positive gearing for also operatively connecting the last two recited shafts, and means whereby one of the said friction and the said positive gearings may be rendered inactive while the other remains active.

6. The combination of driving and driven shafts, an intermediate shaft, means operatively connecting said intermediate shaft with one of the first recited shafts and embodying forwardly and rearwardly driving mechanism, friction gearing operatively connecting said intermediate shaft with the other of the first two recited shafts, positive gearing for also operatively connecting the last two recited shafts, and means whereby one of the said friction and the said positive gearings may be rendered inactive while the other remains active, and at will.

7. The combination of driving and driven shafts, an intermediate shaft, means operatively connecting said intermediate shaft with one of the first recited shafts, and embodying forwardly and rearwardly driving mechanism and also reduction gears, friction gearing operatively connecting said intermediate shaft with the other of the first two recited shafts, positive gearing for also operatively connecting the last two recited shafts, and means whereby one of the said friction and the said positive gearings may be rendered inactive while the other remains active.

8. The combination of driving and driven shafts, an intermediate shaft, means operatively connecting said intermediate shaft with one of the first recited shafts, and embodying forwardly and rearwardly driving mechanism and also reduction gears, friction gearing operatively connecting said intermediate shaft with the other of the first two recited shafts, positive gearing for also operatively connecting the last two recited shafts, and means common to both the said friction and the positive gearings for rendering one inactive while the other remains active.

9. The combination of driving and driven shafts, means operatively connecting said shafts and embodying forwardly and rearwardly driving mechanism, friction gearing connected with said mechanism and embodying a friction disk and a friction gear coöperating therewith, means for changing the relative positions of the gear with relation to the disk, positive gearing also connected with said mechanism for driving it, and means for alternately rendering said positive and friction gearing active and inactive one with respect to the other.

10. The combination of driving and driven shafts, means operatively connecting said shafts and embodying forwardly and rearwardly driving mechanism, friction gearing connected with said mechanisms and embodying a friction disk, and a friction gear coöperating therewith, means for changing the relative positions of the gear with relation to the disk, a positive gear operatively connected with the disk for rotation therewith, and a companion gear operatively connected with the friction gear, said positive and companion gears being movable into and out of mesh by such change of relative positions of the elements of the friction gearing.

11. The combination of driving and driven shafts, a friction disk operatively connected with one of the shafts and arranged to rotate in a substantially horizontal plane, a friction gear operatively connected with the other of said shafts and coöperating with the face of the disk, means for varying the degree of pressure between the gear and the face of the disk at will, and means for equalizing the pressure on the face of the disk, the said pressure varying means embodying a pressure bar extending across and in proximity to the disk and coöperating with the said other shaft, an anti-friction bearing between the bar and the last recited shaft.

In testimony whereof I have signed my name to this specification, in the presence of two subscribing witnesses, on this 13th day of February A. D. 1911.

EUGENE H. SCHOFIELD.

Witnesses:
FRANK M. SCOFIELD,
H. E. STOCKBRIDGE.

---

Copies of this patent may be obtained for five cents each, by addressing the "Commissioner of Patents, Washington, D. C."